(12) United States Patent
Janasek et al.

(10) Patent No.: US 6,193,630 B1
(45) Date of Patent: Feb. 27, 2001

(54) SLIP-BASED SHIFT CONTROL SYSTEM

(75) Inventors: Clayton George Janasek, Independence, KS (US); Richard Marvin Sparks, Bartlesville, OK (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/362,233

(22) Filed: Jul. 26, 1999

(51) Int. Cl.$^7$ .............................. F16H 61/26; F16H 61/06
(52) U.S. Cl. ............................................ 477/156; 477/149
(58) Field of Search .................... 477/156, 158, 477/163, 176

(56) References Cited

U.S. PATENT DOCUMENTS

| | | | |
|---|---|---|---|
| 4,989,477 | 2/1991 | Hunter et al. | 74/866 |
| 5,012,575 | * 5/1991 | Fujiwara et al. | 477/155 X |
| 5,014,573 | 5/1991 | Hunter et al. | 74/866 |
| 5,043,383 | * 8/1991 | Butts et al. | 477/155 X |
| 5,070,747 | * 12/1991 | Lentz et al. | 477/149 |
| 5,072,390 | 12/1991 | Lentz et al. | 364/424.1 |
| 5,113,343 | 5/1992 | Hunter et al. | 364/424.1 |
| 5,283,738 | 2/1994 | Schwab et al. | 364/424.1 |
| 5,413,539 | 5/1995 | Leonard et al. | 475/63 |
| 5,480,363 | 1/1996 | Matsubara et al. | 477/63 |
| 5,520,586 | 5/1996 | Brown et al. | 475/120 |
| 5,704,871 | 1/1998 | Furukawa et al. | 477/62 |
| 5,778,329 | * 7/1998 | Officer et al. | 477/156 X |
| 5,865,707 | * 2/1999 | Shimada et al. | 477/44 |
| 6,007,458 | * 12/1999 | Ohashi et al. | 477/154 |

* cited by examiner

*Primary Examiner*—Charles A Marmor
*Assistant Examiner*—Roger Pang

(57) ABSTRACT

A powershift transmission of an engine-driven vehicle includes input and output shafts, a plurality of fluid pressure operated clutch for controlling flow of torque through the transmission and pressure control valves for controlling fluid pressure communicated to the clutches. A method of controlling an off-going clutch during a shift of the transmission includes detecting a load on the engine, as a function of the detected load, determining a slip pressure, which when applied to the clutch would cause the clutch to slip, and applying the slip pressure to the clutch. If the clutch is not slipping, the pressure applied to the clutch is reduced until relative rotation (slip) between the input and output elements of said clutch is detected. Then a pressure increase is determined, which when applied to the slipping clutch would allow the slipping clutch to continue to slip while transmitting the same torque it was transmitting before it began to slip. Finally, this pressure increase is applied to the slipping clutch.

19 Claims, 3 Drawing Sheets

SLIP-BASED SHIFT CONTROL SYSTEM

BACKGROUND OF THE INVENTION

The invention relates to a vehicle transmission shift control system, and more particularly, to a clutch slip-based powershift transmission shift control system.

Modern agricultural powershift transmissions, such as the AG250 powershift transmission manufactured by Funk Manufacturing, contain multiple electronically controlled, hydraulically actuated wet clutches which direct the flow of power through the transmission. These clutches are grouped according to the portion of the transmission gear train section they control. The group of clutches which are connected directly to or through constantly meshing gears to the transmission output shaft are referred to as range clutches. Clutches between the transmission input and the range clutches are known as speed clutches. During shifting from one transmission input to output speed ratio to another speed ratio, the speed clutches change the flow of power through the transmission from one range clutch to another, resulting in an interim transmission ratio. This prepares the input section of the gear train for the final target transmission speed ratio. All clutch exchanges are controlled by fixed timing values based on a measured engine load. The load signal itself, however, cannot distinguish between the amount of engine power passing through the transmission and the amount absorbed by an external application, such as a power-take-off (PTO) application. It would therefore be desirable to sense only the transmission load, which would allow for precisely matched clutch engagements. When the transmission reaches the interim ratio, which is higher than the target ratio, the transmission output speed and vehicle ground speed will increase or decrease unless the torque transmitted by the off going range clutch is maintained at a constant transmission output torque. Therefore, it would be desirable for the range clutch to maintain its original static torque level in a new dynamic slip condition. Static coefficients of friction are typically different (usually larger) than dynamic coefficients of friction, and clutch torque capacity is dependent upon the coefficient of friction between the clutch discs. When the range clutch slips and transitions from static to dynamic operation, torque capacity changes, resulting in an abrupt shift which vehicle operators perceive as a bad shift.

SUMMARY OF THE INVENTION

Accordingly, an object of this invention is to provide powershift transmission control system which prevents abrupt shifts and which produces smooth shifts.

Another object of this invention is to sense the torque transmitted by an off-going clutch in order to distinguish between torque present at the transmission output shaft and torque present at an external application, such as a PTO application.

Another object of this invention is to improve transmission shifting by controlling the torque transmitted by an off-going clutch during a shift.

Another object of this invention is to control such an off-going clutch so that it transmits, during a slipping (dynamic friction) condition, the same torque that it transmitted during a locked up (static friction) condition.

This and other objects are achieved by the present invention wherein clutch slip is monitored during a shift. Shaft speeds are measured on both sides of a clutch and calculations based on gear ratios are performed during a shift to measure slip speed between the clutch friction disks and separators. The clutch control pressure is gradually reduced or ramped downward until relative rotation (slip) between the off-going clutch friction and reaction plates is detected. The pressure at which slip occurs in the off-going clutch is then used to calculate the portion of the engine load passing through the transmission. This updated engine load number is then used to set various other parameters which are essential to a smooth shift. The clutch control pressure is then increased so that the same torque is transmitted through the slipping clutch without locking up and returning to a static friction condition. Target clutch control pressures may be calculated or modeled for known or measured load conditions and known clutch friction behavior. Clutch control pressure may be held constant, stepped higher or lowered to compensate for the difference in static and dynamic coefficients of friction in the two clutch operating modes. Once clutch slip has been detected and controlled, speed clutches may be exchanged to an interim transmission gear ratio in preparation for a final exchange of two range clutches. Relative speed of the on-coming clutch friction and reaction plates may be monitored to trigger the exchange of torque transmission between the on-coming and off-going clutches with optimal timing (at or near synchronization). This results in a more constant output speed because transmitted torque delivered to the output shaft is more constant. Transmitted torque is controlled by matching clutch control pressure to the operating condition. Maintaining transmitted torque through the clutch in changing conditions minimizes accelerations of the shaft and vehicle, improving shift quality. If the clutch plate static coefficient of friction is greater than the dynamic coefficient of friction, clutch control pressure can be increased when the static to dynamic transition occurs, and this can be detected by sensing relative clutch speeds.

DETAILED DESCRIPTION

This application includes a microfiche appendix including one microfiche and 42 frames. A portion of the disclosure of this patent document contains material which is subject to a claim of copyright protection. The copyright owner has no objection to the facsimile reproduction by anyone of the patent document or the patent disclosure, as it appears in the Patent and Trademark Office patent file or records, but otherwise reserves all other rights whatsoever.

Figure 1:
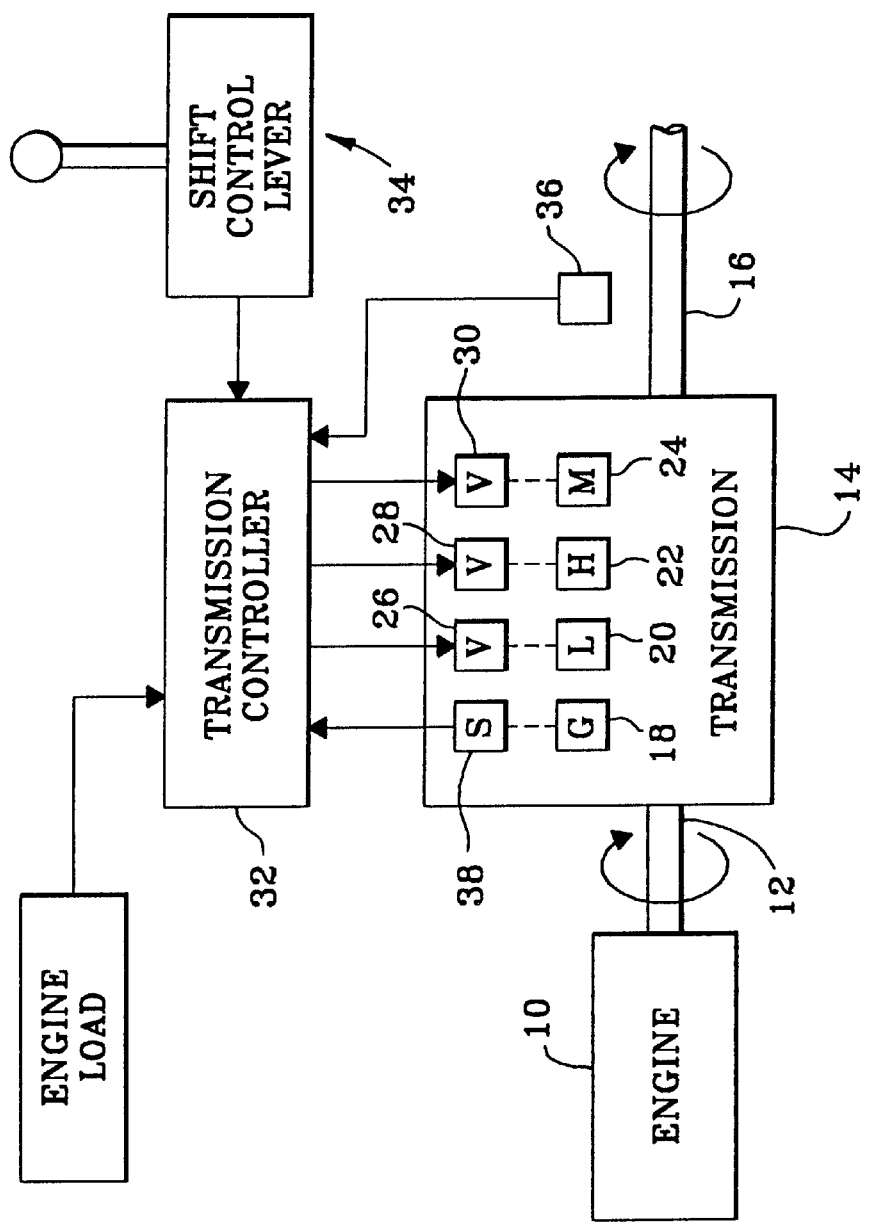
FIG. 1 is a schematic block diagram of a transmission control system to which the present invention is applicable.

Referring to FIG. 1, a vehicle power train includes an engine 10 with an output shaft 12 which drives a power shift transmission (PST) 14. The PST 14 may be an AG250 powershift transmission manufactured by Funk Manufacturing or any other similar electronically controlled powershift transmission. The PST drives an output shaft 16 which is connected to vehicle drive wheels (not shown). The PST includes a plurality of gears, clutches and clutch control valves, with FIG. 1 showing only fifth stage gear (G) 18, L range clutch 20, H range clutch 22, M range clutch 24, L clutch control valve 26, H clutch control valve 28, and M clutch control valve 30. The clutch control valves are preferably electro-hydraulic valves which provide a pressure substantially proportional to the duty cycle of an electrical valve current signal applied to an input thereof, such as are part of the AG250 powershift transmission manufactured by Funk Manufacturing, or any similar valve.

The PST 14 is controlled by a transmission controller 32 which receives signals from an operator controlled shift lever unit 34, an output shaft speed sensor 36 and a speed sensor 38 which preferably senses the speed of a gear internal to the PST 14, such as the $5^{th}$ stage gear 18. The transmission controller 32 also receives an actual Engine Load signal from an electronic engine controller (not shown). The transmission controller 32 is preferably a microprocessor-based control unit, such as is provided with the AG250 powershift transmission manufactured by Funk Manufacturing, or a similar microprocessor-based electronic control unit. The transmission controller 32 executes a control algorithm, and according to the present invention, executes a slip-based control subroutine such as illustrated by the logic flow chart set forth in FIG. 2.

Figure 2A:
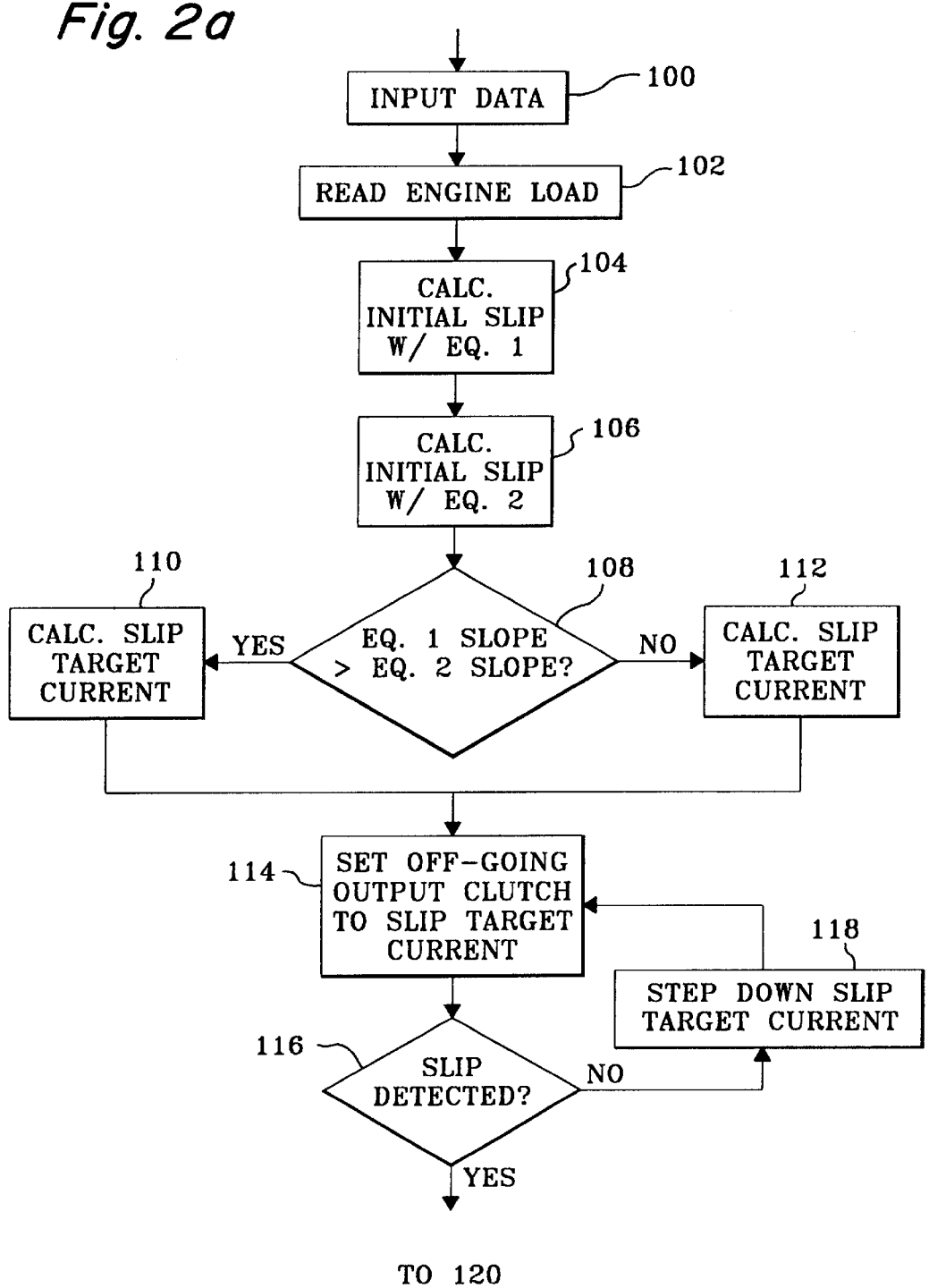
FIG. 2 is a logic flow diagram of an algorithm whereby shifts are controlled as a function of clutch slip.
Figure 2B:
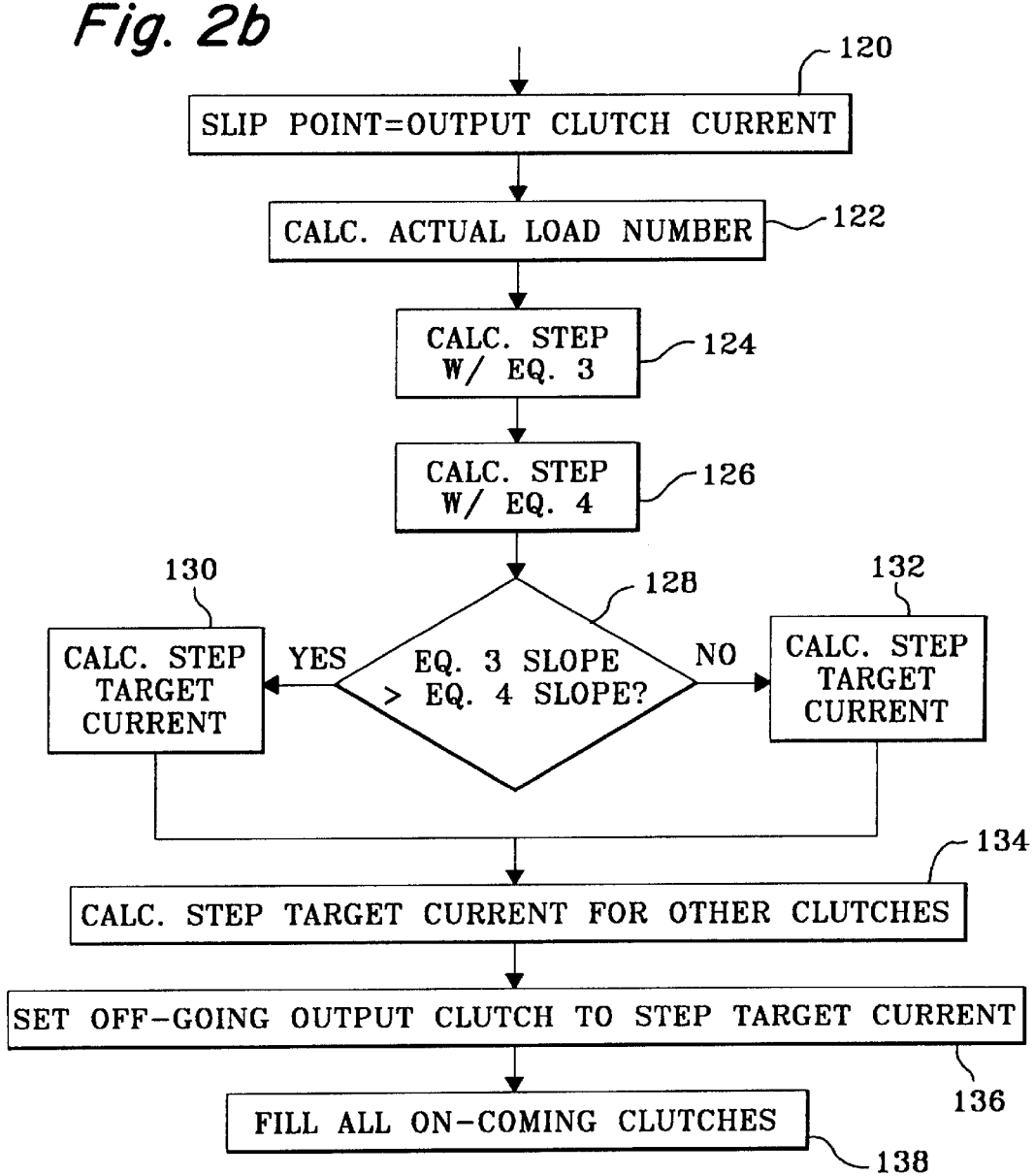

Referring to FIG. 2, the following algorithm description will apply to a shift from $5^{th}$ to $6^{th}$ gear, wherein a 2B clutch (not shown) and L clutch 20 go off and a 2A clutch (not shown) and the M clutch 24 go on, but this description would also apply to other similar shifts of the PST 14.

In step 100, in response to a command to shift from $5^{th}$ to $6^{th}$ gear, various stored numerical values, data and parameters, specific to the PST 14 and the shift to be performed, are retrieved from a data file stored in memory.

In step 102 the actual engine load is read from a signal generated by an engine controller (not shown).

Based upon the engine load signal, step 104 calculates a parasitic-influenced initial estimated valve current value, $Slip_{Low}$, corresponding to a pressure at which the L clutch 20 would be expected to begin to slip using the following equation:

$$Slip_{Low}=((Slip_2-Slip_1)/(Engine_2-Engine_1))\times EngineLoadNumber+ (Slip_2-((Slip_2-Slip_1)/(Engine_2-Engine_1)\times Engine_2)), \quad (1)$$

where $Slip_1$ is an empirically determined stored valve current value corresponding to a clutch pressure at which an unloaded L clutch 20 would begin to slip, $Slip_2$ is an empirically determined stored valve current value corresponding to a clutch pressure at which a partially loaded L clutch 20 would begin to slip, Engine, is an empirically determined, stored value corresponding to the engine load which exists at time unloaded L clutch slips, $Engine_2$ is an empirically determined, stored value corresponding to the engine load which exists at the time partially loaded L clutch slips, and EngineLoadNumber is the actual engine load read by step 102 at the time a shift is commanded. This, $Slip_{Low}$ is a first initial clutch slip pressure value representative of a pressure at which said clutch is expected to slip according to a first equation representing a clutch slip characteristic when parasitic loads on the transmission are significant, such as when the vehicle is not pulling a load such as a plow.

Then, step 106 will then calculate a non parasitic-influenced initial estimated valve current value, $Slip_{High}$, corresponding to a pressure at which the clutch would be expected to begin to slip using the following equation:

$$Slip_{High}=((Slip_3-Slip_2)/(Engine_3-Engine_2))\times EngineLoadNumber+ (Slip_3-((Slip_3-Slip_2)/(Engine_3-Engine_2)\times Engine_3)), \quad (2)$$

where $Slip_2$ is an empirically determined stored valve current value corresponding to a clutch pressure at which a partially loaded L clutch 20 would begin to slip, $Slip_3$ is an empirically determined stored valve current value corresponding to a clutch pressure at which a fully loaded L clutch 20 would begin to slip, $Engine_2$ is an empirically determined, stored value corresponding to the engine load which exists at time partially loaded L clutch 20 slips, $Engine_3$ is an empirically determined, stored value corresponding to the engine load which exists at the time fully loaded L clutch 20 slips, and EngineLoadNumber is the actual engine load read by step 102 at the time a shift is commanded. Thus, $Slip_{High}$ is a second initial clutch slip pressure representative of a pressure at which said clutch is expected to slip according to a second equation representing a clutch slip characteristic when parasitic loads on the transmission are insignificant, such as when the vehicle is pulling a plow.

Step 108 compares the slopes of the two previously described linear equations which map expected off-going L clutch 20 slip pressure value vs. engine load signal. If the slope of Eqn. (1) is greater than the slope of Eqn. (2), then in step 110, then the lower of $Slip_{Low}$ or $Slip_{High}$ is chosen as the initial estimated valve current value, Slip, at which L clutch 20 is expected to slip (plus some margin for error). If the slope of Eqn. (1) is less than the slope of Eqn. (2), then in step 112, then the higher of $Slip_{Low}$ or $Slip_{High}$ is chosen as the initial estimated valve current value, Slip, at which L clutch 20 is expected to slip (plus some margin for error). The intersection of these two equations could be defined as the point at which parasitic transmission torque loads are no longer significant compared to torque loads created by external operating conditions such as draft. Equation 1 describes L clutch 20 slip characteristics in the parasitic region while Equation 2 describes L clutch 20 slip characteristics in the lightly to fully loaded region.

Then, step 114 applies the valve current value Slip (calculated in either steps 110 or 112) to the control valve for the off-going L clutch 20, and the pressure in the L clutch 20 is adjusted accordingly.

Next, step 116 detects slippage of L clutch 20 by calculating a slip speed ratio representing a ratio of output speed (from sensor 36) divided by input speed (from sensor 38) is outside upper and lower limit values stored in memory for the pending shift. If the slip speed ratio is outside these limits, output clutch slip is deemed to be occurring and the valve current value, SlipPoint, at that time is recorded in step 120 and the algorithm proceeds to step 122. This SlipPoint value will depend upon and represent an actual torque load on the transmission 14 and will not include torque loads on other components, such as a power take off (PTO).

If the slip speed ratio is not outside these limits, it is deemed that the L clutch 20 is still locked up and that its pressure needs to be further reduced, and step 116 directs the algorithm to step 118 which reduces the valve current applied to L clutch control valve 26 by a predetermined increment. Over time, multiple executions of step 118 will gradually reduce the valve current and reduce the pressure in L clutch 20.

Step 122 calculates new EngineLoadNumber by inserting the most recently determined Slip value into either equation (1) or (2), whichever was ultimately used, and manipulating the equation (1) or (2) to solve for EngineLoadNumber. This step permits the system to distinguish between power going through the PST 14 or power going through some other device, such as a power take off shaft (not shown). By solving for EngineLoadNumber, the system determines exactly what load condition the PST 14 is operating under and this makes possible a precise and accurate shift control, such as when controlling the pressurization of on-coming clutches.

Based upon the slip point of L clutch 20, a parasitic-influenced pressure step valve current value Step$_{Low}$ is calculated at step 124 using the following equation:

$$Step_{Low}=((Step_2-Step_1)/(Slip_2-Slip_1)\times SlipPoint)+(Step_2-((Step_2-Step_1)/(Slip_2-Slip_1)\times Slip_2)), \qquad (3)$$

where Step$_1$ is an empirically determined stored pressure step value for an unloaded condition of L clutch 20, Step$_2$ is an empirically determined stored pressure step value for a partially loaded condition of L clutch 20, Slip$_1$ and Slip$_2$ are as previously described, and Slip-Point is the valve current value stored at step 120 at the time step 116 detects that a slip condition exists. Thus, step 124 computes the current value which corresponds to a pressure step which will be applied to the slipping L clutch 20. This pressure step is such that L clutch 20 will maintain its original static torque level in the new dynamic state, due to differences in static and dynamic friction. It is intended that equation (3) be used only when the PST 14 is subject to significant parasitic drag forces.

Based upon the slip point of L clutch 20, the non parasitic-influenced pressure step valve current value, Step$_{High}$, is calculated at step 126 using the following equation:

$$Step_{High}=((Step_3-Step_2)/(Slip_3-Slip_2)\times SlipPoint)+(Step_3-((Step_3-Step_2)/(Slip_3-Slip_2)\times Slip_3)), \qquad (4)$$

where Step$_3$ is an empirically determined stored pressure step value for a fully loaded condition of L clutch 20, and Step$_2$, Slip$_2$, Slip$_3$ and SlipPoint are as previously described.

Step 128 compares the slopes of the linear equations (3) and (4) which map off going L clutch 20 slip point vs. required pressure step. If the slope of Eqn. (3) is greater than the slope of Eqn. (4), then in step 130, then the smaller of Step$_{Low}$ or Step$_{High}$ is chosen as the valve current step value, Step, which when applied would cause L clutch 20 to maintain original static torque level while in a dynamic slip condition. If the slope of Eqn. (3) is less than the slope of Eqn. (4), then in step 132, the larger of Step$_{Low}$ or Step$_{High}$ is chosen as the valve current step value, Step, which when applied would cause L clutch 20 to maintain original static torque level while in a dynamic slip condition. The intersection of these two equations could again be defined as the point at which parasitic transmission torque loads are no longer significant compared to torque loads created by external operating conditions such as draft. Equation (3) describes L clutch 20 step requirements in the parasitic region while Equation (4) describes L clutch 20 step requirements in the lightly to fully loaded region.

In step 136 the newly computed Step pressure value from either steps 130 or 132 is applied to the clutch control valve 26, and the pressure in the clutch 20 is adjusted accordingly in order to maintain original static torque capacity in the dynamic mode. Finally, in step 138 all on-coming clutches are filled.

Thus, to summarize, the system described herein comprises a method of controlling an off-going clutch during a shift of a powershift transmission of an engine-driven vehicle and sensing actual transmission load, wherein step 102 operates to detect the load on the engine, and step 104 or 106 determines, as a function of the detected engine load, a slip pressure, which when applied to said clutch would cause the clutch to slip. Step 110 or 112 applies the slip pressure to the clutch. Step 116 determines whether the clutch is slipping. Steps 114–118 operate, if the clutch is not slipping, to reduce the pressure applied to the clutch until the clutch begins to slip. Step 122 determines the portion of the engine load passed through the transmission output shaft based upon the pressure value at which the clutch began to slip. Steps 124–132 determine a pressure increase, which when applied to said slipping clutch would allow said slipping to continue to slip while transmitting the same torque it was transmitting before it began to slip. Step 136 applies this determined pressure increase to the slipping clutch.

As a result of this algorithm, the PST 14 is set up to perform the rest of the shift, the exact transmission power level is known, and the operator is assured of a smooth shift because original torque levels are maintained in a dynamic friction condition.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A method of controlling a powershift transmission of an engine-driven vehicle, the transmission having a fluid pressure operated clutch for controlling flow of torque through the transmission, said clutch being off-going during a shift of the transmission, and a pressure control valve for controlling fluid pressure communicated to the clutch in response to a valve control current applied to an input thereof, the clutch having an input element and an output element, the method comprising:

applying a slip pressure to said clutch so that relative rotation (slip) between the input and output elements of said clutch occurs;

determining an amount of torque transmitted through said clutch as a function of a slip pressure recorded at a time said clutch begins to slip;

determining, after the clutch has begun slipping and as a function of said determined amount of torque, a pressure increase, which when applied to said slipping clutch would allow said slipping clutch to continue to slip while transmitting substantially the same torque it was transmitting before it began to slip; and applying said determined pressure increase to said slipping clutch.

2. The method of claim 1, further comprising:

detecting a load on the engine;

determining the slip pressure as a function of the detected engine load;

detecting rotation speeds of both sides of said clutch and determining if the clutch is slipping;

if said clutch is not slipping, reducing pressure applied to said clutch until relative rotation (slip) between the input and output elements of said clutch is detected; and determining the pressure increase after the clutch has begun slipping.

3. The method of claim 2, wherein:

the slip pressure is determined as a function of Slip$_1$, an empirically determined stored value corresponding to a clutch pressure at which the clutch would begin to slip in an unloaded condition, Slip$_2$ an empirically determined stored value corresponding to a clutch pressure at which the clutch would begin to slip when partially loaded, $Engine_1$ an empirically determined, stored value corresponding to an engine load which exists at a time an unloaded clutch slips, $Engine_2$ an empirically determined, stored value corresponding to an engine load which exists at a time a partially loaded clutch slips, and the detected engine load, according to a first equation.

4. The method of claim 2, wherein:

the slip pressure is determined as a function of $Slip_2$, an empirically determined stored value corresponding to a clutch pressure at which the clutch would begin to slip when partially loaded, $Slip_3$ an empirically determined stored value corresponding to a clutch pressure at which clutch would begin to slip when fully loaded, $Engine_2$ an empirically determined, stored value corresponding to an engine load which exists at a time the clutch slips when partially loaded, $Engine_3$ an empirically determined, stored value corresponding to an engine load which exists at a time the clutch slips when fully loaded, and the detected engine load, according to a second equation.

5. The method of claim 2, wherein:

the pressure increase is determined as a function of $Step_1$, an empirically determined stored value corresponding to a clutch pressure at which the clutch will maintain static torque capacity in dynamic slip mode while in an unloaded condition, $Step_2$ an empirically determined stored value corresponding to a clutch pressure at which the clutch will maintain static torque capacity in dynamic slip mode while partially loaded, $Slip_1$ an empirically determined stored value corresponding to a clutch pressure at which the clutch would begin to slip in an unloaded condition, $Slip_2$ an empirically determined stored value corresponding to a clutch pressure at which the clutch would begin to slip when partially loaded, and the recorded clutch pressure value at the time clutch slip was detected, according to a third equation.

6. The method of claim 2, wherein:

the pressure increase is determined as a function of $Step_2$, an empirically determined stored value corresponding to a clutch pressure at which the clutch will maintain static torque capacity in dynamic slip mode while partially loaded, $Step_3$ an empirically determined stored value corresponding to a clutch pressure at which the clutch will maintain static torque capacity in dynamic slip mode while fully loaded, $Slip_2$ an empirically determined, stored value corresponding to a clutch pressure at which the clutch would begin to slip in a partially loaded condition, $Slip_3$ an empirically determined stored value corresponding to a clutch pressure at which the clutch would begin to slip when fully loaded, and the recorded clutch pressure value at the time clutch slip was detected, according to a fourth equation.

7. The method of claim 2, wherein:

the slip pressure is determined as a function of $Slip_1$, an empirically determined stored value corresponding to a clutch pressure at which the clutch would begin to slip in an unloaded condition, $Slip_2$ an empirically determined stored value corresponding to a clutch pressure at which the clutch would begin to slip when partially loaded, $Engine_1$ an empirically determined, stored value corresponding to an engine load which exists at a time an unloaded clutch slips, $Engine_2$ an empirically determined, stored value corresponding to an engine load which exists at a time a partially loaded clutch slips, and the detected engine load, according to a first equation; and the slip pressure is determined as a function of $Slip_2$, an empirically determined stored value corresponding to a clutch pressure at which the clutch would begin to slip when partially loaded, $Slip_3$ an empirically determined stored value corresponding to a clutch pressure at which clutch would begin to slip when fully loaded, $Engine_2$ an empirically determined, stored value corresponding to an engine load which exists at a time the clutch slips when partially loaded, $Engine_3$ an empirically determined, stored value corresponding to an engine load which exists at a time the clutch slips when fully loaded, and the detected engine load, according to a second equation.

8. The method of claim 7, further comprising:

comparing the slopes of the first and second equations;

selecting a smaller slip pressure if the slope of the first equation is greater than the slope of the second equation; and selecting a larger slip pressure if the slope of the first equation is less than the slope of the second equation.

9. The method of claim 7, further comprising:

determining an actual torque load present in said transmission by manipulation of one of the first and second equations with the determined clutch slip pressure value as input and solving for an actual load number; and pressurizing on-coming clutches of the transmission for a duration which is a function of said actual torque load.

10. The method of claim 7, wherein:

the pressure increase is determined as a function of $Step_1$, an empirically determined stored value corresponding to a clutch pressure at which the clutch will maintain static torque capacity in dynamic slip mode while in an unloaded condition, $Step_2$ an empirically determined stored value corresponding to a clutch pressure at which the clutch will maintain static torque capacity in dynamic slip mode while partially loaded, $Slip_1$ and $Slip_2$ according to a third equation; and the pressure increase is determined as a function of $Step_2$, an empirically determined stored value corresponding to a clutch pressure at which the clutch will maintain static torque capacity in dynamic slip mode while partially loaded, $Step_3$ an empirically determined stored value corresponding to a clutch pressure at which the clutch will maintain static torque capacity in dynamic slip mode while fully loaded, $Slip_2$ an empirically determined, stored value corresponding to a clutch pressure at which the clutch would begin to slip in a partially loaded condition, $Slip_3$ an empirically determined stored value corresponding to a clutch pressure at which the clutch would begin to slip when fully loaded, and the recorded clutch pressure value at the time clutch slip was detected, according to a fourth equation.

11. The method of claim 10, wherein:

comparing the slopes of the third and fourth equations;

setting a smaller step pressure value if the slope of the third equation is greater than the slope of the fourth equation; and setting a larger step pressure value if the slope of the third equation is not greater than the slope of the fourth equation.

12. The method of claim 8, further comprising:

solving the one of the first and second equations which produced the slip pressure for an actual torque load present in the transmission.

13. A method of controlling a powershift transmission of an engine-driven vehicle, the transmission having a fluid pressure operated clutch for controlling flow of torque through the transmission, said clutch being off-going during a shift of the transmission, and a pressure control valve for controlling fluid pressure communicated to the clutch in response to a valve control current applied to an input thereof, the clutch having an input element and an output element, the method comprising:

detecting a load on the engine;

as a function of the detected load, determining a slip pressure, which when applied to said clutch would cause said clutch to slip;

applying said slip pressure to said clutch;

detecting rotation speeds of both sides of said clutch while said clutch is transmitting torque therethrough;

if said clutch is not slipping, reducing pressure applied to said clutch until relative rotation (slip) between the input and output elements of said clutch is detected;

determining an actual torque load present in said transmission as a function of a slip pressure at which said clutch begins to slip;

determining a pressure increase, which when applied to said slipping clutch would allow said slipping clutch to continue to slip while transmitting the same torque it was transmitting before it began to slip; and applying said determined pressure increase to said slipping clutch.

14. A method of controlling a powershift transmission of an engine-driven vehicle, the transmission having a fluid pressure operated clutch for controlling flow of torque through the transmission, said clutch being off-going during a shift of the transmission, and a pressure control valve for controlling fluid pressure communicated to the clutch in response to a valve control current applied to an input thereof, the clutch having an input element and an output element, the method comprising:

detecting a load on the engine;

calculating a first initial clutch slip pressure value representative of a pressure at which said clutch is expected to slip according to a first equation representing a clutch slip characteristic when parasitic loads on the transmission are significant;

calculating a second initial clutch slip pressure value representative of a pressure at which said clutch is expected to slip according to a second equation representing a clutch slip characteristic when parasitic load on the transmission are insignificant;

comparing a slope of the first equation to a slope of the second equation;

setting a slip pressure equal to a smaller of the first and second initial clutch slip pressure values if the slope of the first equation is greater than the slope of the second equation;

setting a slip pressure equal to a larger of the first and second initial clutch slip pressure values if the slope of the first equation is not greater than the slope of the second equation;

applying the slip pressure to said clutch so that relative rotation (slip) between the input and output elements of said clutch occurs;

determining an actual torque load present in said transmission based upon a clutch slip pressure value recorded at a time said clutch begins to slip;

determining a pressure increase, which when applied to said slipping clutch would allow said slipping clutch to continue to slip while transmitting substantially the same torque it was transmitting before it began to slip; and applying said determined pressure increase to said slipping clutch.

15. The method of claim 14, further comprising:

if said clutch is not slipping after application of the slip pressure, reducing pressure applied to said clutch until relative rotation (slip) between the input and output elements of said clutch is detected; and determining the pressure increase after the clutch has begun slipping.

16. The method of claim 14, wherein:

the first equation is a function of $Slip_1$, an empirically determined stored value corresponding to a clutch pressure at which the clutch would begin to slip in an unloaded condition, $Slip_2$ an empirically determined stored value corresponding to a clutch pressure at which the clutch would begin to slip when partially loaded, $Engine_1$ an empirically determined, stored value corresponding to an engine load which exists at a time an unloaded clutch slips, $Engine_2$ an empirically determined, stored value corresponding to an engine load which exists at a time a partially loaded clutch slips, and the detected engine load.

17. The method of claim 14, wherein:

the second equation is a function of $Slip_2$, an empirically determined stored value corresponding to a clutch pressure at which the clutch would begin to slip when a partially loaded, $Slip_3$ an empirically determined stored value corresponding to a clutch pressure at which clutch would begin to slip when fully loaded, $Engine_2$ an empirically determined, stored value corresponding to an engine load which exists at a time the clutch slips when partially unloaded, $Engine_3$ an empirically determined, stored value corresponding to an engine load which exists at a time the clutch slips when fully loaded, and the detected engine load.

18. A method of controlling a powershift transmission of an engine-driven vehicle, the transmission having a fluid pressure operated clutch for controlling flow of torque through the transmission, said clutch being off-going during a shift of the transmission, and a pressure control valve for controlling fluid pressure communicated to the clutch in response to a valve control current applied to an input thereof, the clutch having an input element and an output element, the method comprising:

applying a slip pressure to said clutch so that relative rotation (slip) between the input and output elements of said clutch occurs;

when slip of said clutch occurs, determining an actual torque load present in said transmission;

determining a pressure increase, which when applied to said slipping clutch would allow said slipping clutch to continue to slip while transmitting substantially the same torque it was transmitting before it began to slip; and applying said determined pressure increase to said slipping clutch.

19. A method of controlling a shift of powershift transmission of an engine-driven vehicle, the transmission having a fluid pressure operated clutch for controlling flow of torque through the transmission, said clutch being off-going during said shift of the transmission, and a pressure control valve for controlling fluid pressure communicated to the clutch in response to a valve control current applied to an input thereof, the clutch having an input element and an output element, the method comprising:

during said shift being controlled, applying a slip pressure to said clutch so that relative rotation (slip) between the input and output elements of said clutch occurs;

during said shift being controlled, determining a pressure increase, which when applied to said slipping clutch would allow said slipping clutch to continue to slip while transmitting substantially the same torque it was transmitting before it began to slip; and during said shift being controlled, applying said determined pressure increase to said slipping clutch.

* * * * *